(12) United States Patent
Buchsbaum et al.

(10) Patent No.: US 6,839,176 B2
(45) Date of Patent: Jan. 4, 2005

(54) COMPOSITION AND METHOD OF MAKING HIGH-REFLECTION SILVER MIRRORS OR THIN-FILM OPTICAL FILTERS

(75) Inventors: Philip E. Buchsbaum, Oldsmar, FL (US); James D. Lane, Dunedin, FL (US)

(73) Assignee: Ocean Optics, Inc., Dunedin, FL (US)

( * ) Notice: Subject to any disclaimer, the term of this patent is extended or adjusted under 35 U.S.C. 154(b) by 0 days.

(21) Appl. No.: 10/320,215

(22) Filed: Dec. 16, 2002

(65) Prior Publication Data

US 2004/0114247 A1 Jun. 17, 2004

(51) Int. Cl.$^7$ ................................................. G02B 1/10
(52) U.S. Cl. ........................ 359/584; 359/585; 359/578; 359/586; 359/900; 428/426; 427/162
(58) Field of Search ................................ 359/584, 580, 359/585, 883, 586, 577, 578, 900; 427/162, 166, 167; 428/548, 426, 432

(56) References Cited

U.S. PATENT DOCUMENTS 6,128,126 A * 10/2000 Hohenegger et al. ........ 359/360

* cited by examiner

*Primary Examiner*—Fayez Assaf
(74) *Attorney, Agent, or Firm*—Dennis L. Cook, Esq.

(57) ABSTRACT

An environmentally stable Silver containing mirror or thin-film optical filter having very high reflection values over a large spectral and angular range, and a method for constructing the mirror, or thin-film optical filter, comprising using a substrate that has been exposed to an Argon rich ion stream to prepare the surface. A medium index material is then deposed on the surface with Argon ion bombardment. The Silver is then deposited until it is opaque. A second deposition of the medium index material is next done with the Argon ion bombardment. The coating is then followed with a standard ion assisted deposed optical film to maximize reflection at the desired wavelength and angle of incidence.

13 Claims, 4 Drawing Sheets

AR CLEANING STEP

MEDIUM INDEX DEPOSIT

COMPOSITION AND METHOD OF MAKING HIGH-REFLECTION SILVER MIRRORS OR THIN-FILM OPTICAL FILTERS

FIELD OF THE INVENTION

The present invention relates, in general, to a high-reflection Silver containing mirror or thin-film optical filter and specifically, to composition and method of making an environmentally stable Silver containing mirror or thin-film optical filter having very high reflection values over a wide spectral and incident angular range.

BACKGROUND OF THE INVENTION

The novel process and resulting mirror or thin-film optical filter was designed to overcome some of the drawbacks in using Silver as a mirror coating while retaining it's highly reflective characteristics. Silver has excellent reflectance in the visual and infrared wavelengths but has been generally avoided by designers because of the poor environment and durability problems Silver exhibits.

Silver is a material with excellent optical properties. The use of Silver as an optical thin-film material is extensively described for example in the publication "Thin-film Optical Filters", H. A. Macleod, Adam Hilger Ltd., Second Edition. Unfortunately, Silver has poor environmental compatibility, since it is, on the one hand, relatively soft and consequently can readily be mechanically damaged and, on the other hand, an impairment of optical properties occurs due to corrosion if the silver mirror is exposed without protection against the environment or specific media.

For this reason Silver layers are frequently interleaved in layered systems where the material selected for the remaining layers is determined by the desired optical properties, such as spectral properties, and also by the necessity of increasing the resistance of the Silver layer to environmental influences.

Oxides, Zinc Sulfide, Nitrides, Fluorides, or metals are frequently used in order to protect Silver in films and mirrors. In particular, oxides are used due to their optical properties, their resistance to environmental factors, and also because of their hardness. Applying the oxide layer, however, can cause a degradation of the Silver. Much of the prior art has disclosed attempts to avoid this problem.

For example DR-OS-33 07 661 suggests first covering the silver layer with a further metal layer comprising aluminum, titanium, tantalum, chromium, manganese or zirconium, onto which further metal layers; and lastly an oxide layer is disposed, comprising indium oxide, tin oxide or a mixed oxide thereof DE-OS-35 43 178 suggests a multilayer covering wherein the silver layer, in turn, is covered by a further metal layer comprising tantalum, tungsten, nickel or iron, which further metal layer, in turn, is covered by an oxide layer, wherein SnO, $SiO_2$, $Al_2O_3$, $Ta_2O_5$ or $ZrO_2$ are suggested as the oxide layers. Similarly U.S. Pat. No. 3,682,528 suggests covering the silver layer with a thin nickel layer, if any further layers are to be applied. According to an alternative embodiment, DE 33 27 256 suggests applying at least one hypostoichiometric oxide layer on the silver, comprising, for example, titanium oxide or titanium nitride or a mixture thereof. DE-A-33 29 504 further suggests covering the silver layer with a dielectric layer wherein the material composition in the region of the transition areas, changes gradually and continuously. Titanium oxide is mentioned, for example, as such a dielectric layer.

U.S. Pat. No. 5,510,173 describes substantially transparent copper and silver plus noble metal coatings. These coating's ability to withstand corrosive environments is improved by over-coating the metal layers with a double coating of dielectric. The first coating is made up of a dielectric based on indium and/or zinc, the second coating is made up of a dielectric based on indium and tin.

Lastly, an environmentally stable silver containing mirror having very high reflection values over a large spectral range is disclosed in U.S. Pat. Nos. 6,275,332 and 6,128,126 which comprises a silver containing layer disposed on a substrate, which is covered by a zinc sulfide layer. To keep the sulfur from being set free during the application, or during the vaporization of the zinc sulfide, and attacking the silver, at least one barrier or intermediate layer is placed between the silver containing layer and the zinc sulfide layer.

The high reflective silver mirror or thin-film optical filter of this invention exhibits better durability than the prior art while still maintaining high reflectivity. The prior art's use of Zinc Sulfide is a difficult material to use for coating in a production environment since Sulfur forms sulfuric acid in the presence of humidity and sulfuric acid contamination is very corrosive to Silver.

SUMMARY OF THE INVENTION

The novel process and resulting mirror or thin-film optical filter of this invention was designed to overcome some of the drawbacks described above in using Silver as a mirror coating while retaining it's highly reflective characteristics. Silver has a better reflectance in the visual and infrared wavelengths but has been avoided by designers because of the poor environment and durability problems Silver exhibits.

The process starts with a standard substrate cleaning preparation with an abrasive or chemical cleaning method. The substrate is then transferred to a vacuum coating chamber. The substrate is then exposed to an Argon rich ion stream to further prepare the surface. Next a medium index material, or mixture of materials having a combined medium refractive index, is deposed on the surface with Argon ion bombardment. The Silver is then deposited until it is maximally reflective. A second deposition of the medium index material, or mixture of materials having a combined medium refractive index, is then done, also with the Argon ion bombardment. The second medium index material, or mixture, coating is then followed with a standard ion assisted optical film deposition to maximize reflection at the desired wavelength and angle of incidence.

It is therefore clear that a primary object of this invention is to advance the art of high reflectance Silver mirrors and thin-film optical filters manufacture. A more specific object is to advance said art by providing a method for the manufacture of high reflectance Silver mirrors and thin-film optical filters resulting in an environmentally stable Silver containing mirror or thin-film optical filter having very high reflection values over a wide spectral range.

These and other important objects, features, and advantages of the invention will become apparent as this description proceeds. The invention accordingly comprises methods, the features of construction, combination of elements, and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DESCRIPTION OF THE PREFERRED EMBODIMENTS

It is therefore beneficial to design an enhanced silver mirror or thin-film optical filter that can retain Silver's high reflectance characteristics while remaining stable and durable in various environments.

Figure 1:
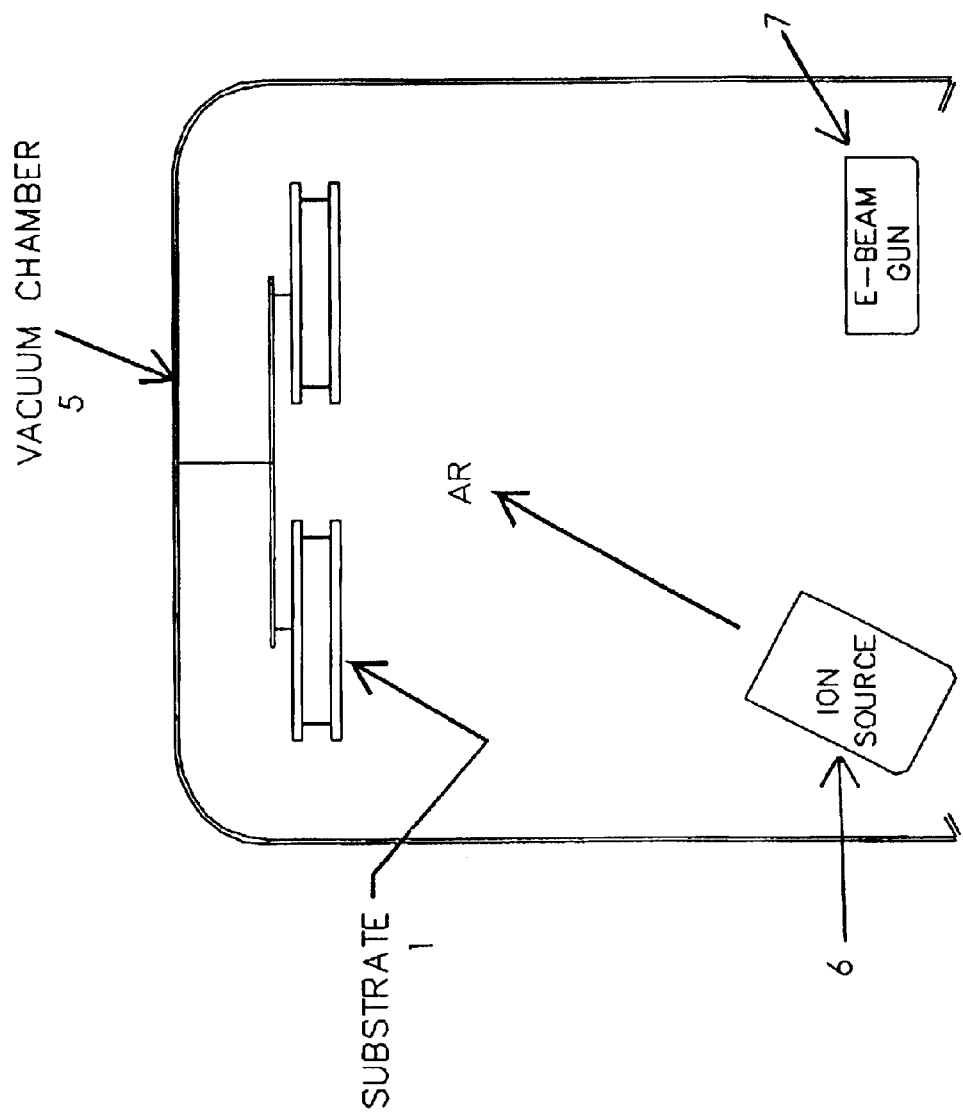
FIG. 1 is a depiction of the vacuum chamber process of Argon rich ion stream exposure.
Figure 2:
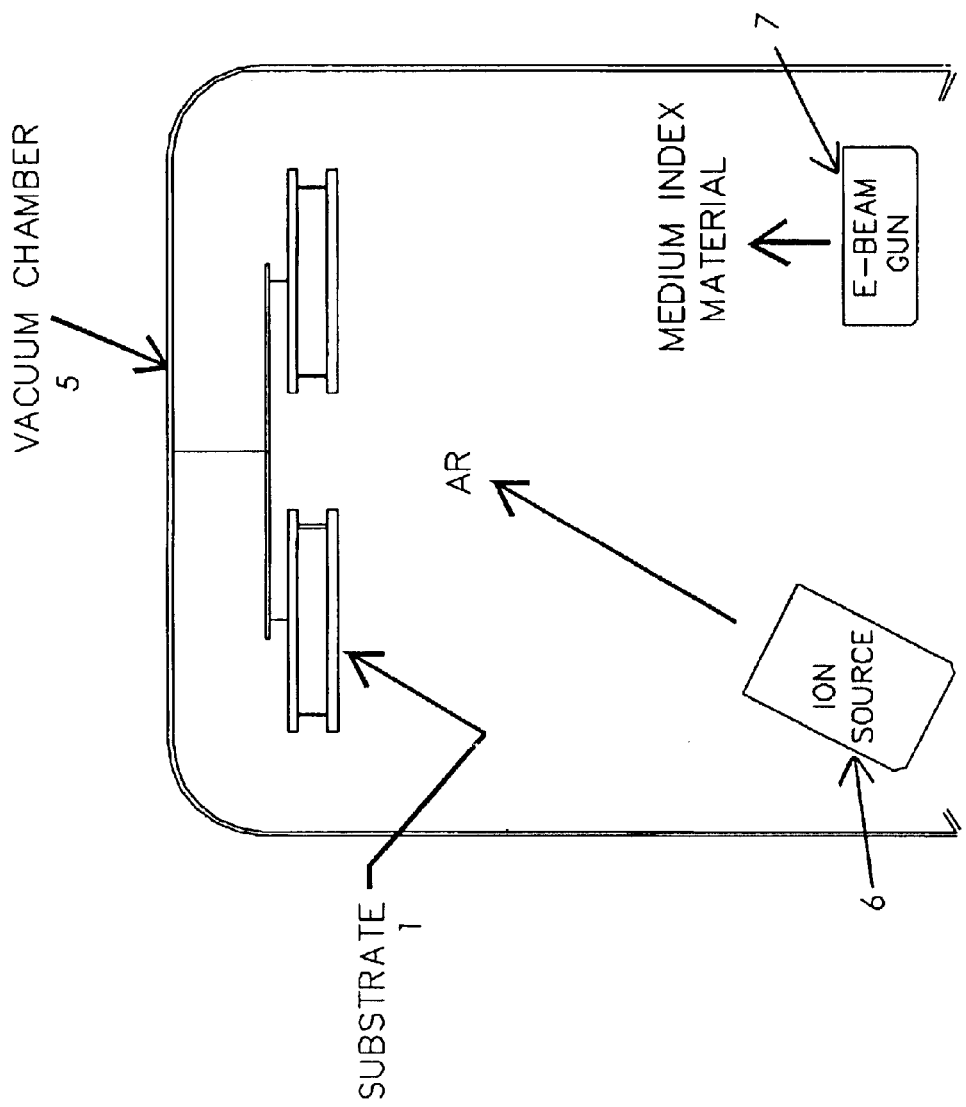
FIG. 2 is a depiction of the medium index material deposition using Argon ion bombardment.
Figure 3:
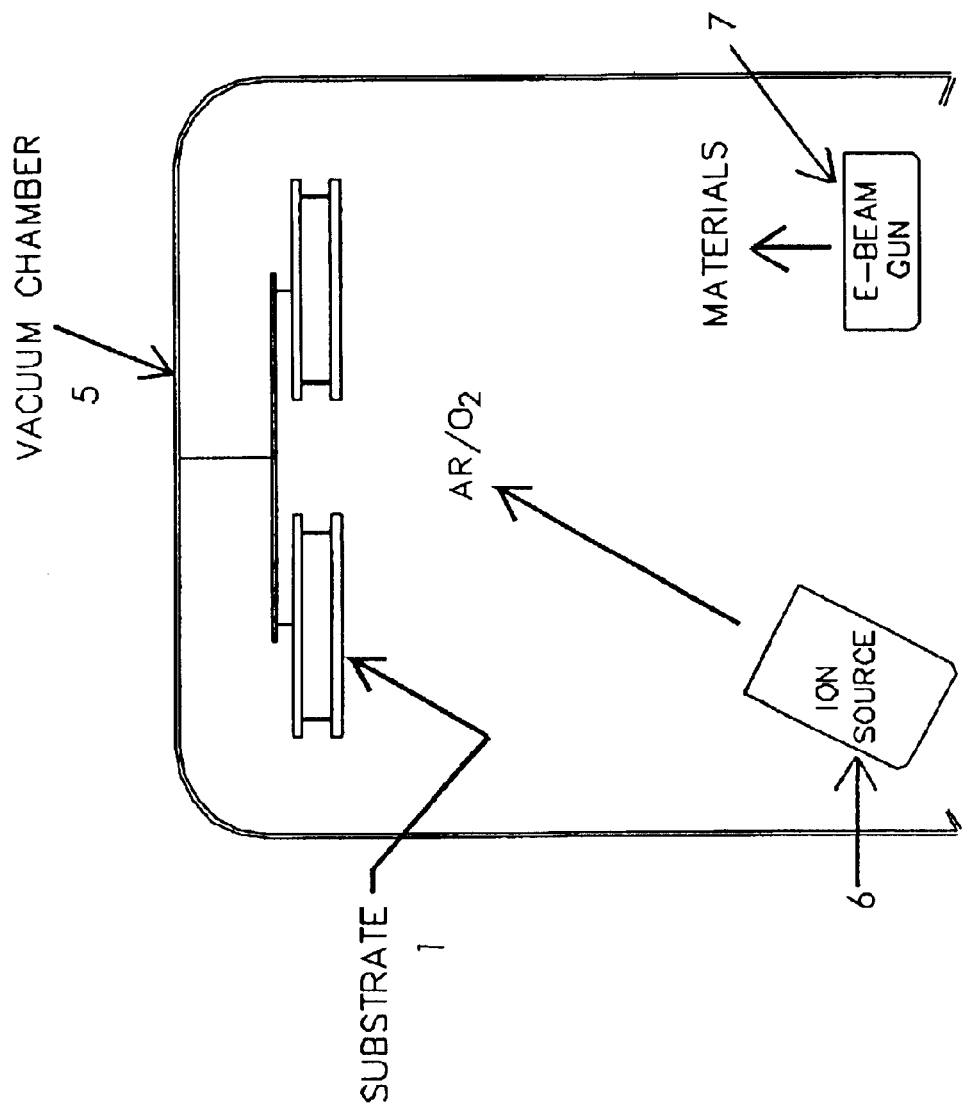
FIG. 3 is a depiction of the ion assisted optical film deposition.
Figure 4:
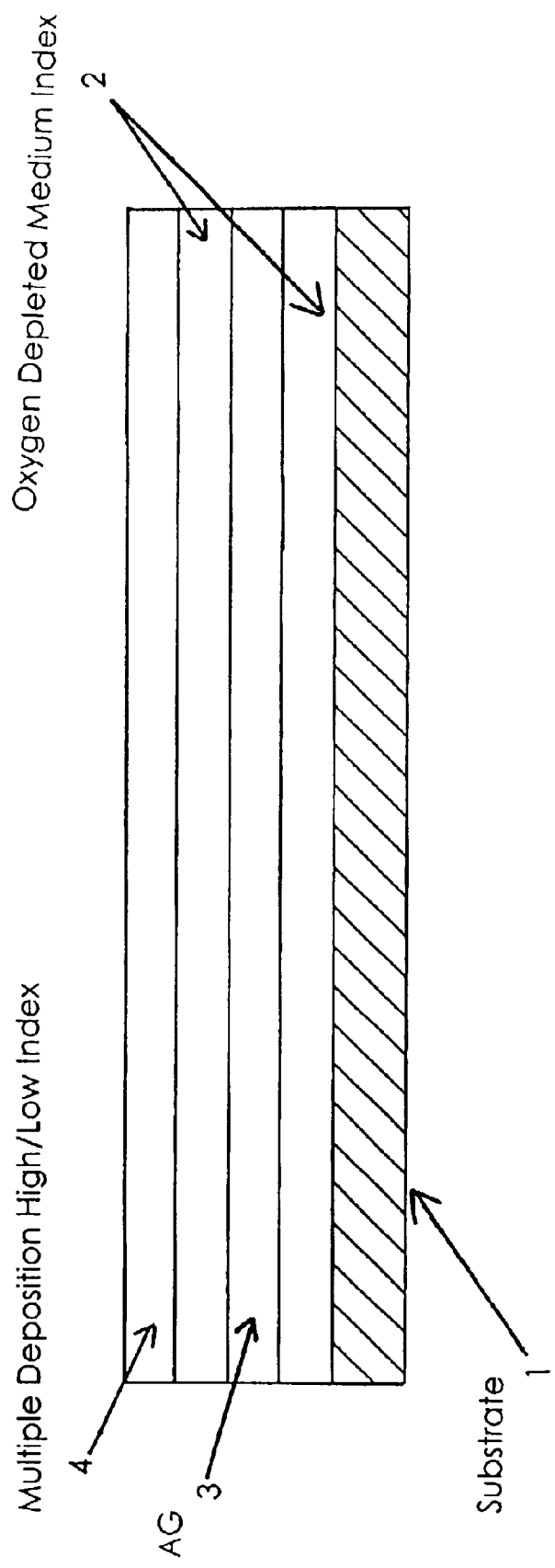
FIG. 4 is a cross sectional representation of the High Reflective Silver Mirror constructed by the process.

The finished product is shown in FIG. 4. The process starts with a standard substrate cleaning preparation using an abrasive or chemical cleaning method well known to those skilled in the art. The substrate (1) is then transferred to a vacuum coating chamber (5) where the substrate (1) is exposed to an Argon rich ion stream emitted by an ion source (6) to further prepare the surface as shown in FIG. 1. This process is also well known to those skilled in the art and is not limited to the method shown in FIG. 1, but rather the substrate (1) can be exposed using any exposing process. Next a medium index material (2) such as Aluminum Oxide, and other such materials, or mixture of materials having a combined medium refractive index, well known in the art, is deposed using an E-Beam Gun (7) on the surface with an Argon ion bombardment method as shown in FIG. 2. Following the deposition of the medium index material (2), or mixture, the Silver (3) is deposited, again using methods well known in the art, until it is maximally reflective, or approximately 0.2 microns thick as shown in the cross sectional drawing of the finished mirror depicted on FIG. 4. A second deposition of the medium index material (2), or mixture of materials having a combined medium refractive index, is then done again using the Argon ion bombardment method employing the E-Beam Gun (7) shown in FIG. 2. Finally, the medium index material (2), or mixture, coating is followed with a standard ion assisted optical film layer (4), or layers, deposition using the ion source (6) and E-Beam Gun (7) as shown in FIG. 3 in order to maximize reflection at the desired wavelength and angle of incidence.

As is well known to those skilled in the art, the substrate cleaning, and the initial Argon ion bombardment, are common in ion assisted coating methods. The novel aspect of the disclosed process, and resulting mirror or thin-film optical filter, is the end result of the sandwiching of the Silver between the medium index materials, or mixture of materials, that have been evaporated during the Argon ion bombardment. In the preferred embodiment of the invention the medium index material used is a mixture that is predominately Aluminum Oxide. More specifically the medium index material is PrAlO3. With the depletion of the oxide during the Argon ion bombardment the Silver is encapsulated in a thin metal rich layer since the Argon ions are disassociating the Oxide.

It will thus be seen that the objects set forth above, and those made apparent from the foregoing description, are efficiently attained. Since certain changes may be made in the foregoing construction without departing from the scope of the invention, it is intended that all matters contained in the foregoing construction or shown in the accompanying drawings shall be interpreted as illustrative and not in a limiting sense.

What is claimed:

1. A method of making a high-reflection mirror or thin-film optical filter comprising:

providing a substrate;

exposing said substrate to an argon rich ion stream;

depositing a first layer of medium index material, or mixture of materials having a combined medium refractive index, on the surface of said substrate with argon ion bombardment to deplete the oxide from said medium index material;

depositing a Silver layer until said Silver layer is maximally reflective;

depositing a second layer of said medium index material, or mixture of materials having a combined medium refractive index, on the surface of said Silver layer with argon ion bombardment to deplete the oxide from said medium index material; and, depositing one or more optical film layers to maximize reflection at the desired wavelength and angle of incidence.

2. A method according to claim 1 including depositing said one or more optical film layers using an ion assisted procedure.

3. A method according to claim 1 wherein said Silver layer is deposited to a thickness of approximately 2 microns.

4. A method according to claim 1 wherein said first layer of medium index material, or mixture of materials having a combined medium refractive index, and said second layer of said medium index material, or mixture of materials having a combined medium refractive index, are primarily Aluminum Oxide.

5. A method according to claim 4 wherein said first layer of medium index material, or mixture of materials having a combined medium refractive index, and said second layer of said medium index material, or mixture of materials having a combined medium refractive index, are PrAlO3.

6. A method according to claim 1 including cleaning said substrate with an abrasive or chemical cleaning method before applying said first layer of said medium index material, or mixture of materials having a combined medium refractive index.

7. A high-reflection mirror or thin-film optical filter comprising:

a substrate;

a first layer of medium index material, or mixture of materials having a combined medium refractive index, deposited on the surface of said substrate;

said first layer of medium index material, or mixture of materials having a combined medium refractive index, deposited with argon ion bombardment to deplete the oxide from said medium index material;

an opaque Silver layer deposited on the surface of said first layer of medium index material, or mixture of materials having a combined medium refractive index;

a second layer of said medium index material, or mixture of materials having a combined medium refractive index, deposited on the surface of said Silver layer;

said second layer of medium index material, or mixture of materials having a combined medium refractive index, deposited with argon ion bombardment to deplete the oxide from said medium index material; and, one or more optical film layers deposited on the surface of said second layer of said medium index material, or mixture of materials having a combined medium refractive index.

8. A mirror or thin-film optical filter according to claim 7 including depositing said one or more optical film layers using an ion assisted procedure.

9. A mirror or thin-film optical filter according to claim 7 wherein the material and thickness of said one or more optical film layers is chosen to maximize reflection at the desired wavelength and angle of incidence.

10. A mirror or thin-film optical filter according to claim 7 wherein said Silver layer is deposited to a thickness of approximately 2 microns.

11. A mirror or thin-film optical filter according to claim 7 wherein said first layer of medium index material, or mixture of materials having a combined medium refractive index, and said second layer of said medium index material, or mixture of materials having a combined medium refractive index, are primarily Aluminum Oxide.

12. A mirror or thin-film optical filter according to claim 11 wherein said first layer of medium index material, or mixture of materials having a combined medium refractive index, and said second layer of said medium index material, or mixture of materials having a combined medium refractive index, are PrAlO3.

13. A mirror or thin-film optical filter according to claim 7 wherein said substrate has been cleaned with an abrasive or chemical cleaning method.

* * * * *